June 12, 1934. J. W. WINTER 1,962,631
SEPARATOR
Filed July 29, 1931 4 Sheets-Sheet 4
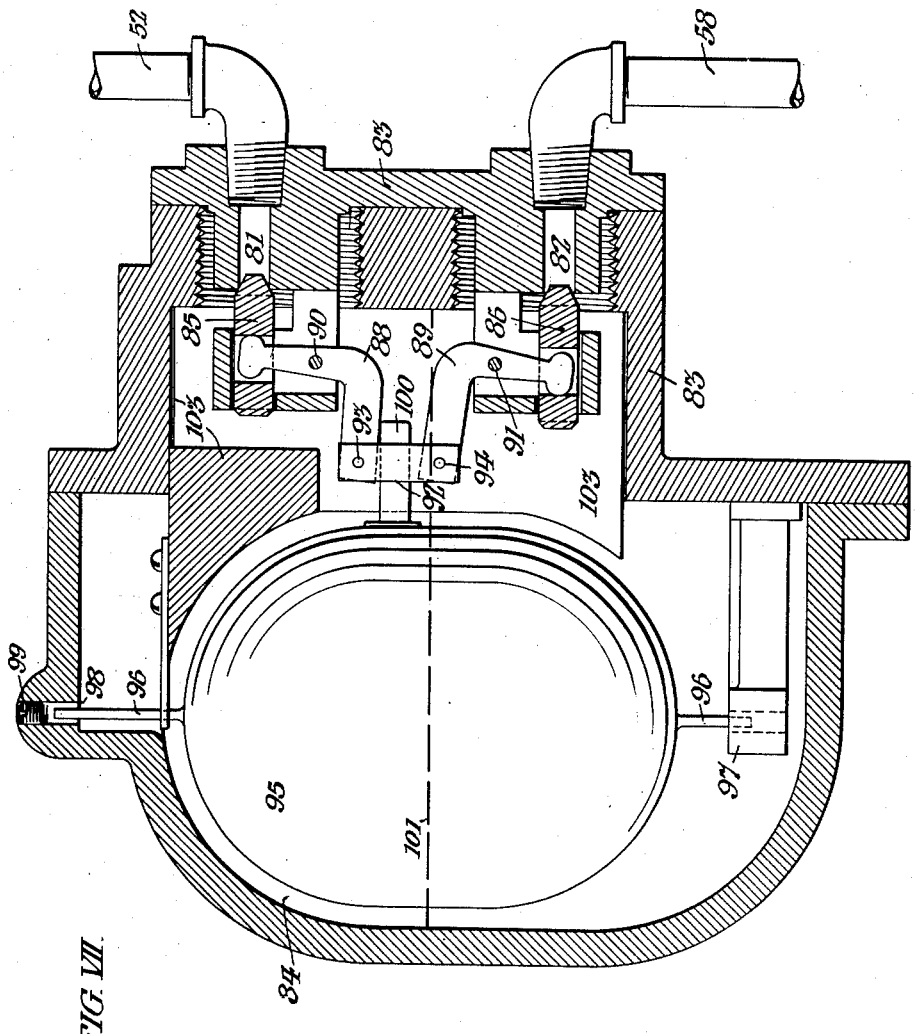
FIG. VII.
INVENTOR:
JOSEPH WILLIAM WINTER,
BY Patented June 12, 1934

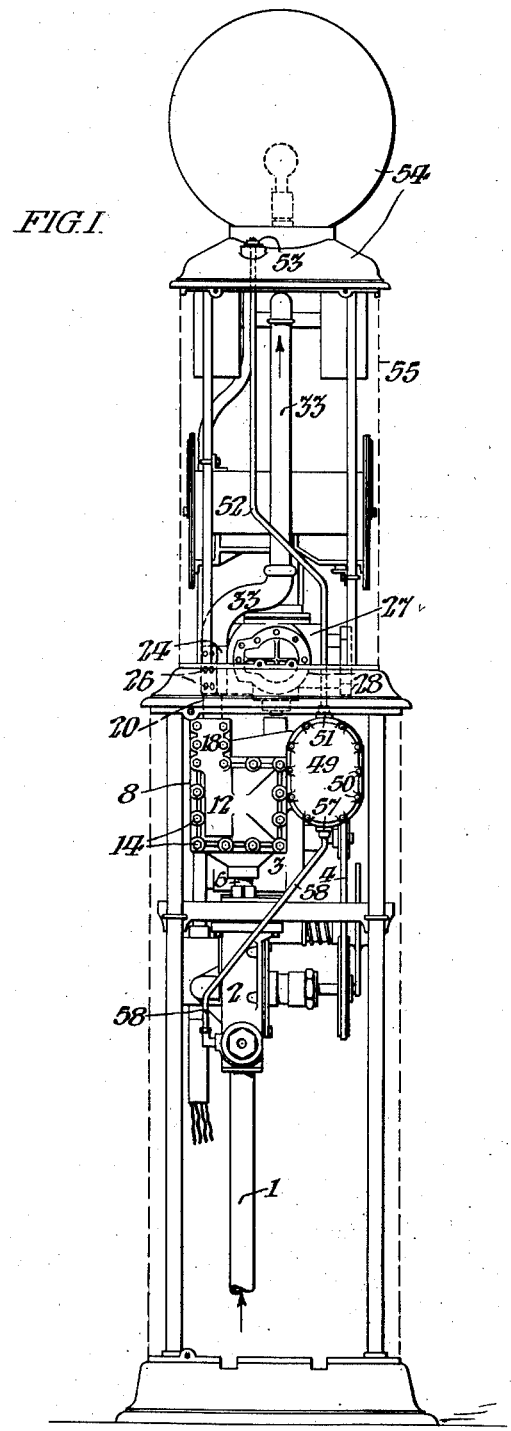
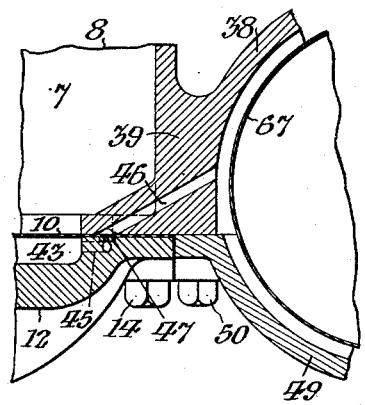
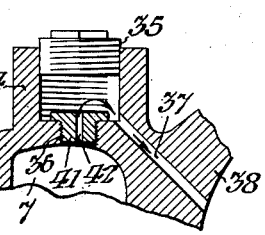

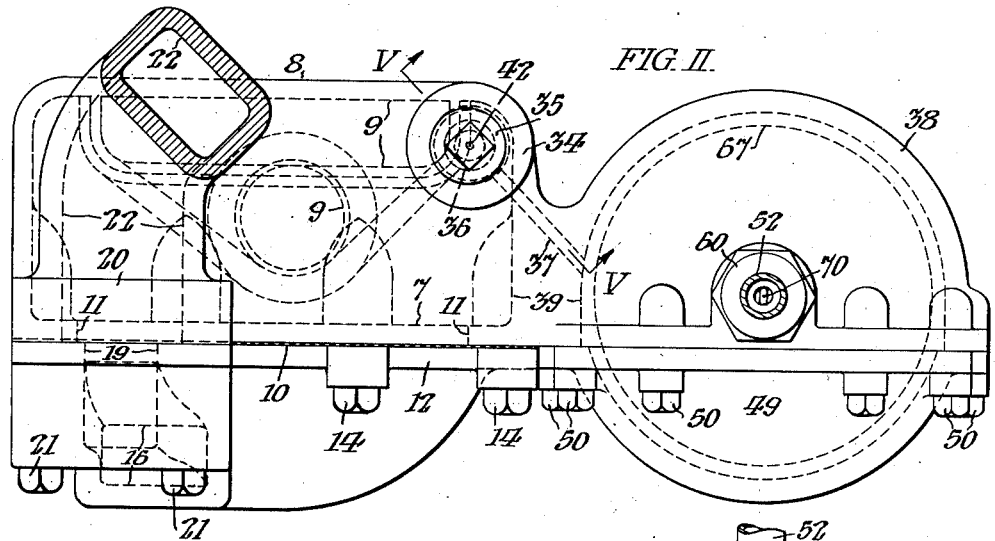

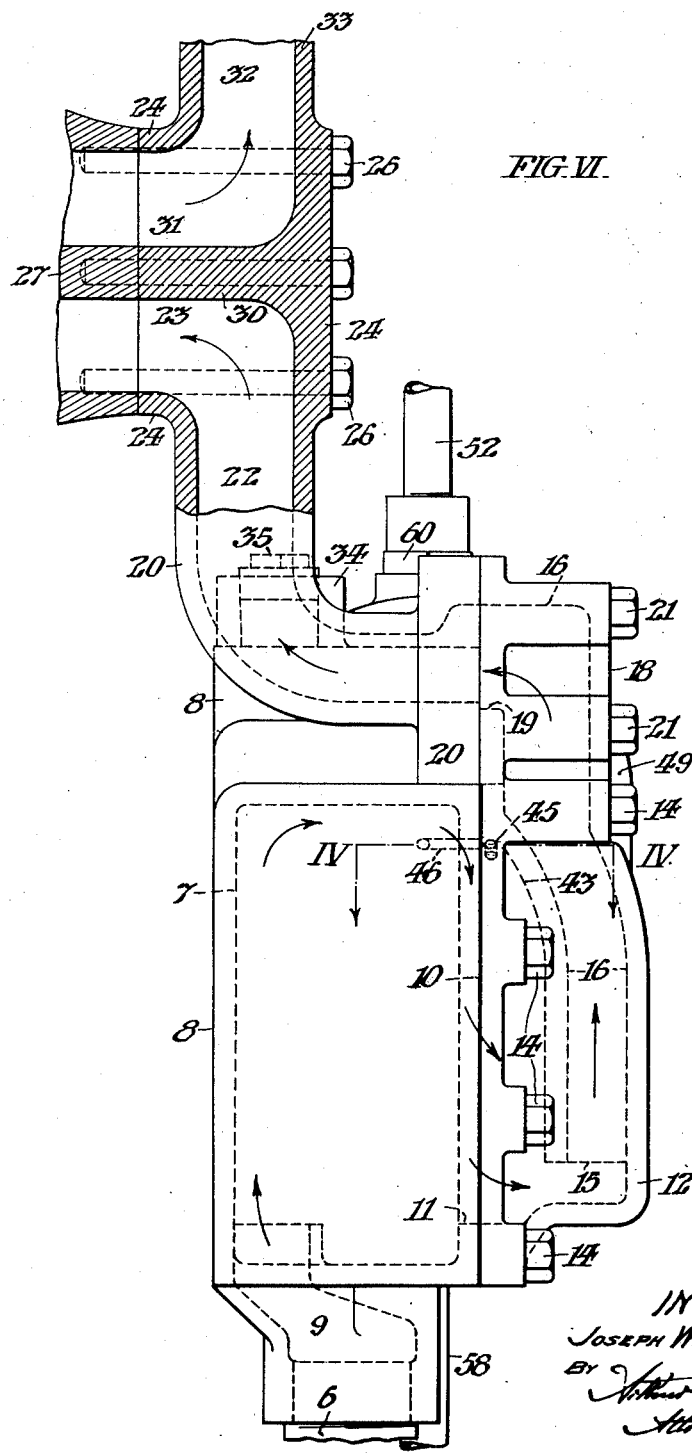

1,962,631

UNITED STATES PATENT OFFICE 1,962,631

SEPARATOR

Joseph William Winter, Penfield, Pa., assignor to John Wood Manufacturing Company, Inc., Conshohocken, Pa., a corporation of Delaware Application July 29, 1931, Serial No. 553,711

5 Claims. (Cl. 183—2.5)

My invention may be advantageously employed in apparatus for dispensing gasolene by means of a pump which extracts the liquid from a subjacent tank and delivers it under pressure thru a meter and dispensing hose. Said meter includes a rotatable index pointer adapted to traverse a circular series of graduations on a dial to indicate gallons and fractions thereof dispensed, and said pointer is turned in accordance with the flow of fluid through said meter. In some localities the law requires the inclusion of a transparent container between the pump and the hose thru which the liquid must pass and in which the purchaser may observe whether or not liquid is being delivered to the hose. If there is a leak in the suction line from the subjacent tank to the pump, air is drawn into the liquid conduit and is manifested by bubbles in the liquid passing thru the container and, under some circumstances, bubbles of vapor of the liquid being dispensed may similarly appear. Of course, the passage of air or other gas thru the metering pump, in lieu of liquid, renders the manifestation of the amount dispensed erroneous. Therefore, the principal purpose and effect of my invention is to insure the delivery of liquid without the inclusion of bubbles of air or vapor and to the full amount indicated by the meter.

As hereinafter described, the essential feature of my invention is that means are provided for separating the liquid from any lighter fluid, such as air or vapor of the liquid, on its way from the subjacent tank to the meter and to insure that only liquid shall be delivered to the meter and dispensed therethru. Such means includes what I hereinafter term a gas eliminator in the liquid supply conduit leading from the pump to the meter and which includes a foraminous screen gas trap thru which the liquid is pumped with the effect of separating air and other gas bubbles from it. The gas thus separated is withdrawn from said trap thru a small conduit leading into a float chamber having a gas vent opening near the top thereof. Said vent is normally open to the atmosphere, to permit the escape of gas thus separated from the liquid, but said vent is provided with a valve adapted to prevent the discharge of any liquid therethru by connection of the valve with a float in said chamber which is uplifted to close the vent valve if and when there is any abnormal accumulation in the float chamber of liquid which has been entrained with the gas in its passage from the trap to said float chamber and precipitated in the bottom of the latter as the gas escapes. Any such liquid carried over into the float chamber is normally withdrawn back into the dispensing system, free from gas, by means of a small conduit leading from the bottom of the float chamber to the suction side of said liquid pump, and controlled like said vent.

This invention is an improvement upon that disclosed in my application Serial No. 478,620 filed August 29, 1930, for Letters Patent of the United States for Improvement in liquid dispensing apparatus, in that it is so constructed and arranged that all of the internal parts of the gas eliminator are accessible upon removal of a substantially flat closure of one side of the eliminator casing, which is directly accessible thru a doorway in the side of the pump stand, and the liquid discharge outlet from said eliminator casing is directly connected with the suction side of said pump.

The latter features of construction and arrangement are disclosed in my application Serial No. 544,797 filed June 16, 1931, which has matured into Patent No. 1,888,192 Nov. 15, 1932 but the present invention is an improvement upon the structure shown in the latter application, in that the fluid voids in the gas trap are reduced to the least possible minimum. Whereas, apparatus so constructed and arranged as to permit the accumulation of compressible fluid in, or in communication with, the conduit thru which the liquid is being dispensed, permits back flow and discharge of the liquid thru the gas vent when such compressible fluid is relieved of the pressure of the liquid by cessation of the operation of the pump which is dispensing the liquid. The effect of eliminating such voids is to prevent accumulation in the apparatus of any body of fluid susceptible of being compressed by the pressure upon the liquid being dispensed.

Moreover, in the present invention both the gas and liquid vent valves are carried by the float, in rigid relation therewith.

My invention includes the various novel features of construction and arrangement hereinafter more definitely specified.

In said drawings; Fig. I is a side elevation of what is known to the trade as a curb stand, containing a convenient embodiment of my invention; the sheet metal casing of said stand being omitted to show the internal mechanism. Fig. II is a partly sectional plan view of the gas eliminator shown in Fig. I, but on a larger scale. Fig. III is a partly sectional elevation of the gas eliminator shown in Fig. I, but on a larger scale. Fig. IV is a fragmentary plan sectional view of said eliminator taken on the line IV, IV, in Fig. VI. Fig. V is a fragmentary vertical sectional view taken on the line V in Fig. II. Fig. VI is a partly sectional elevation of the left hand side of said gas eliminator. Fig. VII is a vertical sectional view of a modified form of gas eliminator embodying my invention.

The liquid to be dispensed is stored in an underground tank from which it is withdrawn thru the conduit 1 by and to the pump 2 which is conveniently electrically operated by the motor 3 connected therewith by the belt 4.

Said pump 2 discharges the liquid thru the conduit 6 into the screen trap chamber 7 in the eliminator casing 8, thru the inlet port 9. Said port 9 is wedge shaped at its lower end and is elongated at its upper end, so as to extend a considerable distance across said chamber 7 as indicated in Fig. II. The purpose of that shape is to uniformly distribute the incoming liquid in said chamber 7, with respect to the entire area of the foraminous screen 10, conveniently a woven wire fabric of extremely fine mesh. Said screen is rectangular and extends over the outlet 11 in said trap chamber 7 as indicated in Fig. II. Said screen is held in fluid tight relation with said casing 8 by the cover 12, which is rigidly, but removably, connected with said casing 8 by the twelve cap bolts 14 shown in Fig. I, some of which are shown in Fig. II. The outlet port 15 in said cover 12, for the liquid which passes thru said screen 10, is at the lower end of the outlet conduit 16 which is conveniently cast in unitary relation with said cover as indicated in Fig. VI. The construction and arrangement of said inlet port 9 and outlet port 15 are such that the liquid flows into said screen chamber 7 at the rear thereof, with reference to Figs. I and II and upward along the rear wall thereof until it strikes the upper wall of the screen chamber 7 and returns downward along the face of said screen 10 toward the bottom of the latter so as to pass thru said screen substantially uniformly with respect to its entire area; such downward flow of the liquid with respect to the screen being induced by the location of the outlet port 15 near the bottom thereof.

Said cover 12 has the upward extension 18, at the left hand side thereof in Fig. I, containing said conduit 16 which terminates in the port 19 in registry with the conduit coupling 20 which is detachably rigidly connected therewith by the four tap bolts 21 in said extension 18.

Said coupling 20 has a passageway 22 terminating in the port 23 in the manifold pad 24. Said manifold has six holes for tap bolts 26 which hold it with said port 23 in registry with the liquid inlet port leading into the meter casing 27 shown in Fig. I between adjoining cylinders 28 on said casing. There is a circular series of four such cylinders on said casing, inclosing four reciprocatory pistons driven by the flow of the liquid. Said manifold has, separated from said port 23 by the partition 30, the port 31 which registers with the liquid outlet port from said meter casing and leads into the passageway 32 in communication with the conduit 33 shown in Fig. I. Said conduit 33 leads, thru a sight gage, to a flexible dispensing hose provided with a nozzle controlled by a nozzle valve, as described at length in my copending application Serial No. 478,620 aforesaid.

The effect of pumping the liquid thru said foraminous screen 10 is to separate from the liquid entrained bubbles of air or other gas; which rises to the top of the screen chamber 7 as the liquid passes downward with respect to said screen 10 in said chamber 7 on its way out thru said port 15 in said cover 12, shown in Figs. III and VI.

As shown in Figs. II and V; said eliminator casing 8 has, preferably in unitary relation therewith, at the top of said screen chamber 7, the cup 34 provided with the removable closure 35 which is conveniently a screw plug. Said casing 8 has the passageway 36, 37, leading from said screen chamber 7 into the float chamber 38 which, as shown in Figs. II and IV, is formed in said eliminator casing 8 and separated from said screen chamber 7 by the partition 39. The tubular screw threaded bushing 41 which is detachably fitted in said passageway 36, has the restricted passageway 42 therethru and constitutes removable means in said cup 34 restricting the effective area of said passageway 36, 37. By substitution of bushings with different sized passageways 42 therethru, such restriction is variable to attain the most efficient elimination of air and other gas from the liquid, with the minimum discharge of liquid therewith thru the passageway 36, 37 into said chamber 38; in any liquid dispensing apparatus.

Although, under normal conditions, all of the air or other gas is thus eliminated from the liquid which flows thru said screen 10 and finds its way into said float chamber 38 thru the passageway 36, 37; under some abnormal conditions there may be a slight accumulation of such gas at the top of the chamber 43 in said cover 12 shown in Figs. IV and VI. Therefore, I provide another passageway 45, 46 which, as shown in Fig. IV, extends thru said cover 12, screen 10, and casing 8 into the float chamber 38. I prefer to provide means to also variably restrict that passageway, by means of the tubular plug 47 adjoining the screen 10 in said cover 12. It is to be understood that plugs 47 having passageways of different sizes therethru may be interchangeably fitted in the passageway 45 to attain the most efficient effect of the latter. The purpose of said passageways 36, 37, and 45, 46 is to eliminate from the stream of liquid on its way to be dispensed, and direct into said float chamber 38, only the air or other gas which is entrained with the liquid before it strikes said screen 10. However, with the air and other gas thus eliminated from the stream of liquid being dispensed, there is deposited in said float chamber 38 a small amount of the liquid and, therefore, I provide means to normally discharge the eliminated gas from said float chamber 38 into the atmosphere and to intermittently discharge from said chamber 38, back into the liquid conduit, on the suction side of said pump 2, the small amount of liquid which thus accumulates in said float chamber 38.

As shown in Figs. I, II, and III; said float chamber 38 is provided with the removable cover 49 upon the same side of the eliminator casing 8 as said cover 12 and secured to said casing by the ten tap bolts 50 indicated in Fig. III. Said float chamber 38 has the gas vent 51, shown in Fig. III, which is in communication with the gas vent conduit 52, shown in Fig. I, terminating in the perforated cap 53 at the top of the hood 54 on the curb stand 55 so that any air or vapor of gasolene vented from said float chamber 38 is discharged into the outer atmosphere above said dome 54. Said float chamber 38 also has the liquid vent 57 in communication with the conduit 58, shown in Fig. I, leading back to the suction side of said pump 2; so that when said vent 57 is open, any liquid which has passed over into said float chamber 38 with the gas aforesaid is drawn back into the liquid stream thru said vent 57 and conduit 58.

As shown in Fig. III; said vents 51 and 57 are alined in coaxial relation respectively in the top and bottom walls of said float chamber 38. The screw threaded bushings 60 and 61 are respectively axially adjustable toward and away from each other, in said vents 51 and 57 and provided with respective valve seats 62 and 63 for the gas vent valve 65 and the liquid vent valve 66. Said valves 65 and 66 are carried by the single float 67, in rigid relation therewith, and are conveniently spherical balls in coaxial relation with the guide rod 68 which extends thru said float 67 and said valves and projects beyond the latter into the respective bushings 60 and 61. Said guide rod 68 also extends into guide plates 70 and 71 which are rigidly connected with said rod, conveniently by solder, and fit in the passageways thru said bushings and maintain said valves in coaxial relation with their seats in said bushings but permit fluid to flow freely past said valves when the latter are open.

The arrangement last above described is such that the weight of said float 67, which is conveniently formed of pressed sheet copper, contains air and is hermetically sealed, normally holds said gas vent valve 65 open and said liquid vent valve 66 shut. Said float chamber 38, with said liquid vent valve 66 and float 67, thus forms a trap for the liquid which finds its way into said chamber with the gas which it is desired to eliminate, and the trapped liquid indicated by the dotted line 78 shown in Fig. III, is thus retained in said float chamber 38 by the liquid vent valve 66 in closed position, while the gas is permitted to escape from said chamber thru the vent 51, while the gas vent valve 65 is in open position. It is important that said liquid vent 57 shall be always submerged, as, otherwise, fluid other than liquid might be sucked back into the pump line, by the pump 2, from said float chamber 38 and the purpose of the eliminator thus defeated. However, when the liquid rises to a predetermined level above that indicated at 78 in Fig. III, the float 67 is thereby lifted to open said liquid vent valve 66 from said vent 57 and permit the liquid to be withdrawn from said chamber 38, to said level 78, by the suction of the pump 2, so that the float 67 is lowered to its normal position in which said liquid vent 57 is closed.

The level of the trapped liquid at which said liquid vent valve 66 is opened may, of course, be variably predetermined by relative axial adjustment of said bushings 60 and 61 and they are preferably so adjusted that the intermittent opening of the liquid vent valve 66 as above described, is effected without closing the gas vent 51 by the gas vent valve 65. However, if under any abnormal condition, the liquid is deposited in said float chamber 38 at a rate in excess of its normal intermittent withdrawal thru said liquid vent 57; said float 67 is raised by the liquid deposited in said float chamber 38 to an abnormal height and sufficient to temporarily close the gas vent 51 by the gas vent valve 65 to thus prevent any possible discharge of liquid thru said gas vent conduit 52.

Fig. VII shows a modification of my invention wherein the gas vent 81 and the liquid vent 82 are in parallel relation in the removable cover 83 of the float chamber 84. The valves 85 and 86 for the respective vents 81 and 82 are adapted to be operated in alternation by respective levers 88 and 89 respectively fulcrumed at 90 and 91 and coupled by a pair of parallel links 92 pivotally connected therewith at 93 and 94. Such lever actuated valves are described and claimed in my copending application Serial No. 544,797 aforesaid but, in that case, they are operated by a float carried by the upper lever. In Fig. VII, the float 95 is provided with a guide rod 96 projecting therethru into bearings 97 and 98 respectively at the bottom and top of said chamber 84; the bearing 98 having the set screw 99 axially adjustable therein to limit the vertical movement of said float. Said float has the projection 100 from the side thereof extending between said links 92 and adapted to lift the lever 88 to close the gas vent 81 and open the liquid vent 82 when the liquid rises above the level 101 in said float chamber and to lower the lever 89 when said liquid is released from said chamber through the liquid vent 82 so as to close the latter and open the gas vent 81.

In that form of my invention, the fluid voids in the chamber 84 are reduced to the minimum by inclusion of the filling piece 103 which only leaves enough clearance around the float and lever mechanism aforesaid to permit operation thereof.

Therefore, I do not desire to limit myself to the precise details of construction and arrangement herein set forth, as it is obvious that various modifications may be made therein without departing from the essential features of my invention, as defined in the appended claims.

I claim:

1. In liquid dispensing apparatus, means for eliminating fluid other than liquid from the stream of liquid dispensed, including a gas trap, having a gas vent and a liquid vent in coaxial alinement, in opposite walls thereof; a float substantially filling said trap; valves rigidly connected with said float, in cooperative relation with said gas vent and liquid vent; axially adjustable bushings in said vents having seats for the respective valves; said float being movable, by liquid caught in said trap, to close said gas vent and open said liquid vent, when the trapped liquid reaches a level predetermined by the axial adjustment of said bushings.

2. Apparatus as in claim 1; wherein said valves are connected by a metal rod extending through said float and projecting beyond the ends of said valves, into said bushings, holding said valves in coaxial relation, and serving to guide them in proper relation with said vents.

3. Apparatus as in claim 1; wherein said valves are connected by a metal rod extending through said float and projecting beyond the ends of said valves, into said bushings, holding said valves in coaxial relation, and serving to guide them in proper relation with said vents; and guide plates on said rod, respectively extending in said bushings, for maintaining said valves in coaxial relation with their respective seats in said bushings.

4. In liquid dispensing apparatus; means for eliminating fluid other than liquid from the stream of liquid dispensed, including a gas trap, having a gas vent and a liquid vent in coaxial alinement; a float substantially filling said trap; valves rigidly connected with said float, in cooperative relation with said gas vent and liquid vent; guide means rigidly connected with said float and projecting beyond the respective valves; and axially adjustable bushings in said vents having seats for the respective valves and respectively inclosing said guide means; whereby said float with its valves and guide means may be inserted and removed with respect to said trap, when said bushings are retracted, but is normally held in said trap, in cooperative relation with said vents, when said bushings are adjusted toward said float; said float being uplifted by liquid caught in said trap to close said gas vent and open said liquid vent, when the trapped liquid reaches a level predetermined by the relative axial position of said bushings.

5. In liquid dispensing apparatus, means for eliminating fluid other than liquid from the stream of liquid dispensed, including a gas trap having a gas vent and a liquid vent; a float substantially filling said trap; guide rod means rigidly connected with said float and projecting in coaxial alinement respectively above and below the same; axially adjustable means in coaxial relation with said upwardly projecting guide rod limiting the vertical movement of said float; and valves operatively connected with said float, in cooperative relation with said gas vent and liquid vent; whereby the level of the trapped liquid at which said gas vent is closed and said liquid vent opened is predetermined.

JOSEPH WILLIAM WINTER.